US008988212B2

(12) United States Patent
Carruthers

(10) Patent No.: US 8,988,212 B2
(45) Date of Patent: Mar. 24, 2015

(54) ELECTRIC VEHICLE PEDESTRIAN WARNING SYSTEM

(71) Applicant: GM Global Technology Operations LLC, Detroit, MI (US)

(72) Inventor: Susan T. Carruthers, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 13/973,161

(22) Filed: Aug. 22, 2013

(65) Prior Publication Data

US 2015/0054642 A1 Feb. 26, 2015

(51) Int. Cl.
*B60Q 1/22* (2006.01)
*B60Q 5/00* (2006.01)

(52) U.S. Cl.
CPC .................................... *B60Q 5/008* (2013.01)
USPC ...... 340/463; 340/472; 340/384.1; 340/396.1

(58) Field of Classification Search
USPC ............. 340/463, 472, 474, 692, 693.5, 7.53, 340/7.62, 382, 384.1, 388.1, 396.1, 944, 340/901
See application file for complete search history.

(56) References Cited

U.S. PATENT DOCUMENTS

| 8,217,766 | B2 * | 7/2012 | Nakayama | 340/384.1 |
| 8,248,273 | B2 * | 8/2012 | Hayashi et al. | 340/943 |
| 8,537,030 | B2 * | 9/2013 | Perkins | 340/904 |
| 8,854,229 | B2 * | 10/2014 | Kim et al. | 340/904 |

* cited by examiner

*Primary Examiner* — Toan N Pham
(74) *Attorney, Agent, or Firm* — Cantor Colburn LLP

(57) ABSTRACT

An electric vehicle pedestrian warning system includes an encapsulating container disposed in a location of an electric vehicle (EV) that is exterior to a cabin of the EV. The warning system also includes a speaker affixed to an interior portion of the container, an amplifier coupled to the speaker, a computer processor communicatively coupled to the amplifier, and logic executable by the computer processor. The logic is configured to transmit a sound file to the speaker through the amplifier over a vehicle network upon activation of the EV. The sound file includes a pedestrian warning sound. A first portion of the pedestrian warning sound is output by the speaker and amplified using acoustical properties of the encapsulating container. The first portion of the pedestrian warning sound is amplified in a low frequency range capable of being cancelled by an active noise cancellation system that is located in the interior cabin.

20 Claims, 3 Drawing Sheets

ELECTRIC VEHICLE PEDESTRIAN WARNING SYSTEM

FIELD OF THE INVENTION

The subject invention relates to electric vehicle pedestrian warning systems and, more particularly, to an electric vehicle pedestrian warning system that provides low-frequency sound enhancement and high-frequency sound directivity.

BACKGROUND

As electric drive vehicles, such as hybrid electric vehicles (HEVs), plug-in hybrid electric vehicles (PHEVs), and all-electric vehicles (EVs), produce much less noise than their internal combustion engine (ICE) vehicle counterparts, vehicle manufacturers typically install pedestrian warning systems in these vehicles, which produce sufficient noise to alert pedestrians, cyclists, and the blind to their presence during operation. Pedestrian warning systems may produce sound that mimics traditional ICE sounds, or other types of warning sounds that include pitch shifting. While these warning systems provide a useful and important service, they can be disquieting to the vehicle occupants who hear them in the vehicle's interior cabin.

In the United States, proposed government regulations specifying minimum pedestrian warning sound levels have been recently developed as part of the Federal Motor Vehicle Safety Standards (FMVSS) for electric and hybrid vehicles. In order to meet these requirements, many vehicle manufacturers may need to implement modifications to existing vehicle specifications. For example, larger speakers may be required to meet the low frequency sound level requirements of these mandated pedestrian warning systems. These modifications will likely add to the overall manufacturing costs and mass of the vehicles.

Accordingly, it is desirable to provide a means to comply with pedestrian warning system requirements while mitigating the undesirable sounds perceived in the vehicle cabin, and minimizing additional product costs.

SUMMARY OF THE INVENTION

In one embodiment of the invention, a pedestrian warning system for an electric vehicle is provided. The system includes an encapsulating container disposed in a location of the electric vehicle that is exterior to an interior cabin of the electric vehicle, a speaker affixed to an interior portion of the encapsulating container, an amplifier coupled to the speaker, a computer processor communicatively coupled to the amplifier and a vehicle network, and logic executable by the computer processor. The logic is configured to transmit a sound file to the speaker through the amplifier over the vehicle network upon activation of the electric vehicle. The sound file includes a pedestrian warning sound. A first portion of the pedestrian warning sound is output by the speaker and amplified using acoustical properties of the encapsulating container. The first portion of the pedestrian warning sound is amplified in a low frequency range capable of being cancelled by an active noise cancellation system that is located in the interior cabin and coupled to the vehicle network.

In another embodiment of the invention, a pedestrian warning system for an electric vehicle is provided. The system includes a vehicle structural rail disposed in an underbody of the electric vehicle, a speaker affixed to an interior portion of the vehicle structural rail, an amplifier coupled to the speaker, a computer processor communicatively coupled to the amplifier and a vehicle network, and logic executable by the computer processor. The logic is configured to transmit a sound file to the speaker through the amplifier over the vehicle network upon activation of the electric vehicle. The sound file includes a pedestrian warning sound. A first portion of the pedestrian warning sound is output by the speaker and amplified using acoustical properties of the vehicle structural rail. The first portion of the pedestrian warning sound is amplified in a low frequency range capable of being cancelled by an active noise cancellation system that is located in the interior cabin and coupled to the vehicle network.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
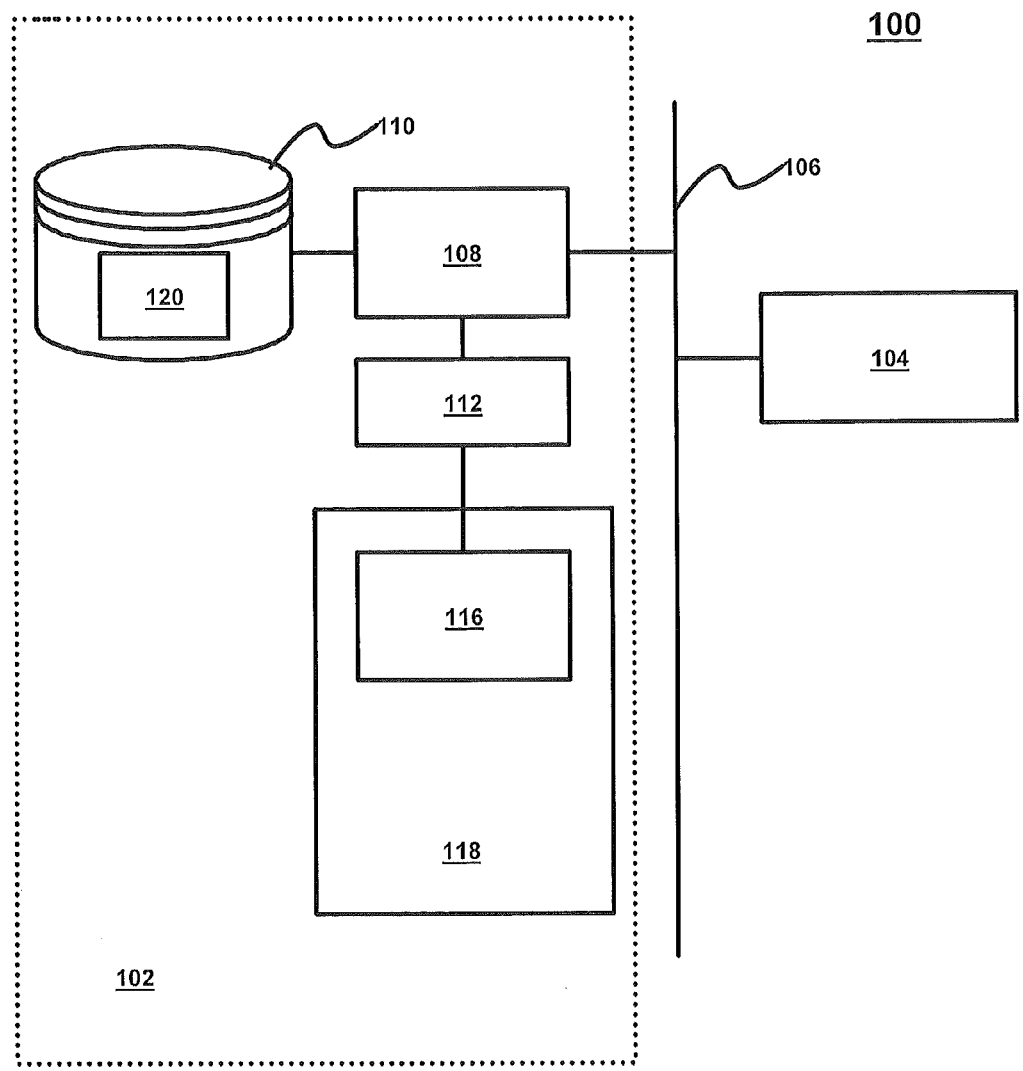
FIG. 1 is a diagram of a system upon which electric vehicle pedestrian warning system features may be implemented in accordance with an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, an electric vehicle (EV) pedestrian warning system is provided. The EV pedestrian warning system leverages the geometric and acoustical properties of vehicle components to achieve minimum required sound levels while minimizing additional costs. In addition, the EV pedestrian warning system manipulates the pedestrian warning sounds such that cancellation of the noise, as perceived by vehicle occupants in the interior cabin of the vehicle, can be performed through an active noise cancellation (ANC) system. These, and other features, will now be described.

Turning now to FIG. 1, a system 100 for implementing pedestrian warning sound features will now be described. The system 100 forms part of an electric drive vehicle, e.g., hybrid electric vehicle (HEV), plug-in hybrid electric vehicle (PHEV), or all-electric vehicle (EV).

The system 100 of FIG. 1 includes a pedestrian warning system 102 and an active noise cancellation (ANC) system 104, both of which are communicatively coupled to a vehicle network 106.

The ANC 104 performs active noise cancellation or reduction functions regarding noise produced by the operation of various vehicle components using the vehicle's audio system (not shown). Noise cancellation or reduction functions may include emitting a sound wave having an amplitude that is equal to the sound (wave) to be reduced or cancelled, but with an antiphase, or inverted phase. The two waves together cancel each other out. In an embodiment, the ANC 104 also performs noise cancellation functions for noise produced by the pedestrian warning system 102 and perceived by occupants of the vehicle's cabin, as will be described further herein. The ANC 104 may be disposed in an interior cabin location of the vehicle.

The ANC 104 may be implemented in hardware and software, e.g., the ANC 104 may include a speaker, digital signal processor, and algorithm for providing the instructions used to process the signals. In one embodiment, the ANC 104 is configured to cancel noise in the interior cabin that is in the range of 45 Hz to 190 Hz.

The pedestrian warning system 102 generates noise that is distributed through one or more speakers on the vehicle, which speakers are external to the interior cabin of the vehicle. The system 102 is activated to alert pedestrians of the presence of the vehicle. The activation may be a manual process (e.g., initiated by an option provided to a vehicle operator) or may be an automatic process (e.g., where the vehicle automatically initiates the pedestrian warning system 102 when the vehicle is operating at a speed within a predefined range (e.g., between 1-19 mph)). In addition, the pedestrian warning system 102 may be configured to generate different sounds based on the operation performed by the vehicle (e.g., accelerating versus decelerating).

In an embodiment, the warning sound may be simulated vehicle engine sounds (e.g., sound expected from a vehicle's internal combustion engine) or other pitching shifting sounds within a specified frequency range.

The pedestrian warning system 102 includes a computer processor 108 communicatively coupled to a storage device 110. The storage device 110 stores logic 120 that is executed by the computer processor 108 to implement the pedestrian warning system sounds as described herein. In an embodiment, the logic 120 may be configured to generate sound files commensurate with sounds associated with the current speed of the vehicle, as well as the changes in speed due to acceleration and deceleration.

The computer processor 108 includes hardware elements (e.g., circuitry, logic cores, registers, etc.) for processing data configured to implement the pedestrian warning sounds described herein. While the computer processor 108 is shown in FIG. 1 as being incorporated with the pedestrian warning system 102, it will be understood that the embodiments are not so limited. For example, the computer processor 108 may be a central processing node for the vehicle that is configured to facilitate operations of various components of the vehicle (e.g., as a command center). In this embodiment, the computer processor 108 may be part of one of the vehicle system's control systems, for example, chassis, engine, and body, to name a few.

The pedestrian warning system 102 also includes a container 118. The container 118 houses a speaker 116 that is disposed therein. The speaker 116 may be an all-weather audio speaker typically employed in pedestrian warning systems. For example, the speaker may be configured to have a diameter of 65 mm, a thickness of 30 mm, and a power output of 1 Watt. In one embodiment, the speaker 116 may be a product of Denso® Corporation, a business headquartered in Kariya, Aichi Prefecture, Japan.

The container 118 is also referred to herein as an encapsulating container 118, as it houses the speaker 116 and has encapsulating physical properties, as will be described further herein. In one embodiment, the container 118 may be an existing receptacle in the vehicle, e.g., a structural rail in the engine compartment or underbody of the vehicle. Alternatively, the container 118 may be manufactured particularly for housing the speaker 116. In an embodiment, if an existing receptacle in the vehicle is used as the container 118 (e.g., a structural rail), the receptacle may be configured with a baffle or similar structure to partition the receptacle, such that the portion of the receptacle used in implementing the pedestrian warning system features will be of a predetermined length, as will be described further herein. The configuration of the container 118 (e.g., shape, length, diameter, etc.) may be determined as a function of the targeted or desired frequency output. These features are described further in FIGS. 2 and 3.

The pedestrian warning system 102 also includes an amplifier 112 that is communicatively coupled to the computer processor 108 and the speaker 116. The amplifier 112 receives sound files from the computer processor 108 and transmits the information as sound waves to the speaker 116.

The vehicle network 106 may be implemented using wireless and/or wired means. The vehicle network 106 may be a high-speed serial data bus, e.g., supported by Controller Area Network (CAN) protocols or other vehicle network.

Figure 2:
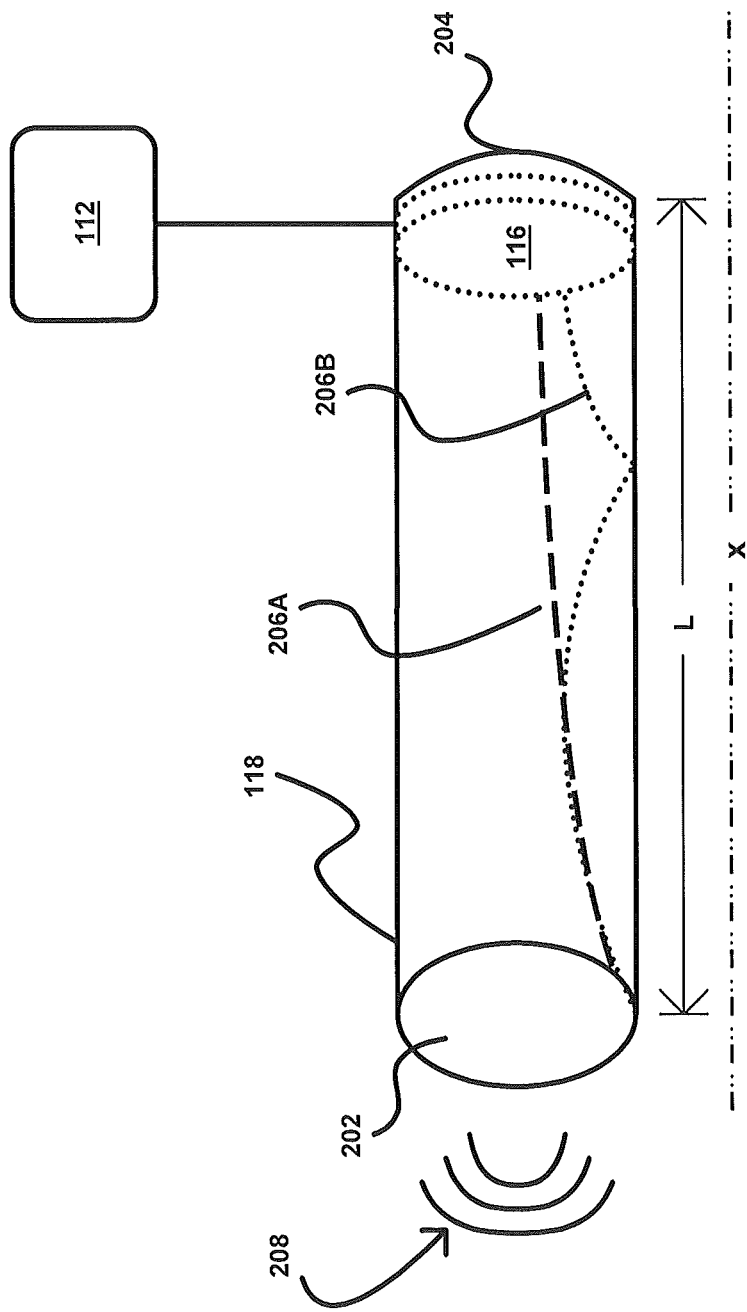
FIG. 2 is a diagram depicting a portion of an electric vehicle pedestrian warning system in accordance with an embodiment.

Turning now to FIG. 2, an embodiment of the encapsulating container 118 will now be described. FIG. 2 represents a perspective view of the encapsulating container 118. In addition, the container 118 shown in FIG. 2 relates to a custom-designed container, as compared to an existing rail or structure of the vehicle.

In the embodiment shown in FIG. 2, the encapsulating container 118 is configured to have a cylindrical shape. A first end 202 is open and a second end 204 is closed.

While the shape of the container 118 is described as cylindrical, it will be understood by one of ordinary skill in the art that the shape is not so limited. For example, the shape may be conical or rectangular.

The container 118 is configured to be of a specified length (L) and is substantially hollow with the exception of the speaker 116, which is affixed to an interior portion thereof. In particular, the speaker 116 is disposed at or near the closed end 204 of the container 118 and faces the open end 202. The length (L) of the container 118 is determined as a function of a targeted low frequency range, such that the acoustical properties of the container 118 are capable of enhancing or amplifying a low frequency portion (also referred to as 'low frequency acoustical content' and 'first portion') of the warning sound at the desired or targeted low frequency range.

In operation, a sound file from the computer processor 108 (FIG. 1) is transmitted from the amplifier 112 to the speaker 116, which outputs the warning sound, and which consists of low frequency acoustical content 206A/206B and high frequency acoustical content 208 (also referred to herein as 'high frequency portion of the warning sound' and 'second portion of the warning sound'). In an embodiment, the low frequency portion of the warning sound is below 400 Hz, and the high frequency portion of the warning sound is above 400 Hz.

Based on the length (L) of the container 118, the resonant frequencies thereof allow the pedestrian warning sound to be amplified in the low frequency range, such as between 45 Hz and 190 Hz (without requiring any increase to the size of the speaker 116) where the ANC 104 (FIG. 1) is effectively able to cancel out the noise in the interior cabin of the vehicle. A formula for determining acoustic resonant frequencies of sound in the container 118 of FIG. 2 may be represented as:

$$f_n = \frac{nc}{4L}$$

where $f_n$=resonant frequencies of the container 118; n=1, 3, 5 . . . , (integer number of the resonant mode); and c=speed of sound in air (353 m/s). L is the length of container 118.

The low frequency acoustical content refers to one or more standing waves in the container 118, two examples of which are shown in FIG. 2. As depicted in FIG. 2 by way of non-limiting example, low frequency content 206A reflects a resonant mode where n=1, and low frequency content 206B reflects a resonant mode where n=3.

In operation, the pedestrian warning system 102, once activated (e.g., either manually by an operator of the vehicle or automatically in response to vehicle speed and/or acceleration data monitored by the vehicle), produces a warning sound, via the computer processor 108, through the amplifier 112, and to the speaker 116 in the encapsulating container 118. As indicated above, the warning sound may be any audio noise generated within a specific frequency range and having pitch shifting properties, such as simulated engine sounds. In an embodiment, the warning sound is produced to be in conformance with government regulations with respect to a minimum sound volume specified across a frequency range. Thus, in an embodiment, the low frequency sound produced by the pedestrian warning system's 102 speaker 116 is amplified by the container 118.

As indicated above, the acoustical properties of the container 118 allow the low frequency portion of the pedestrian warning sound to be amplified to a target low frequency range, such as between 45 Hz and 190 Hz, where the ANC 104 (FIG. 1) is effectively able to cancel out the noise in the interior cabin of the vehicle. Thus, the ANC 104 reduces the level of the warning sound having a frequency between 45 Hz and 190 Hz, as perceived in the cabin of the vehicle through a noise cancellation process.

Figure 3:
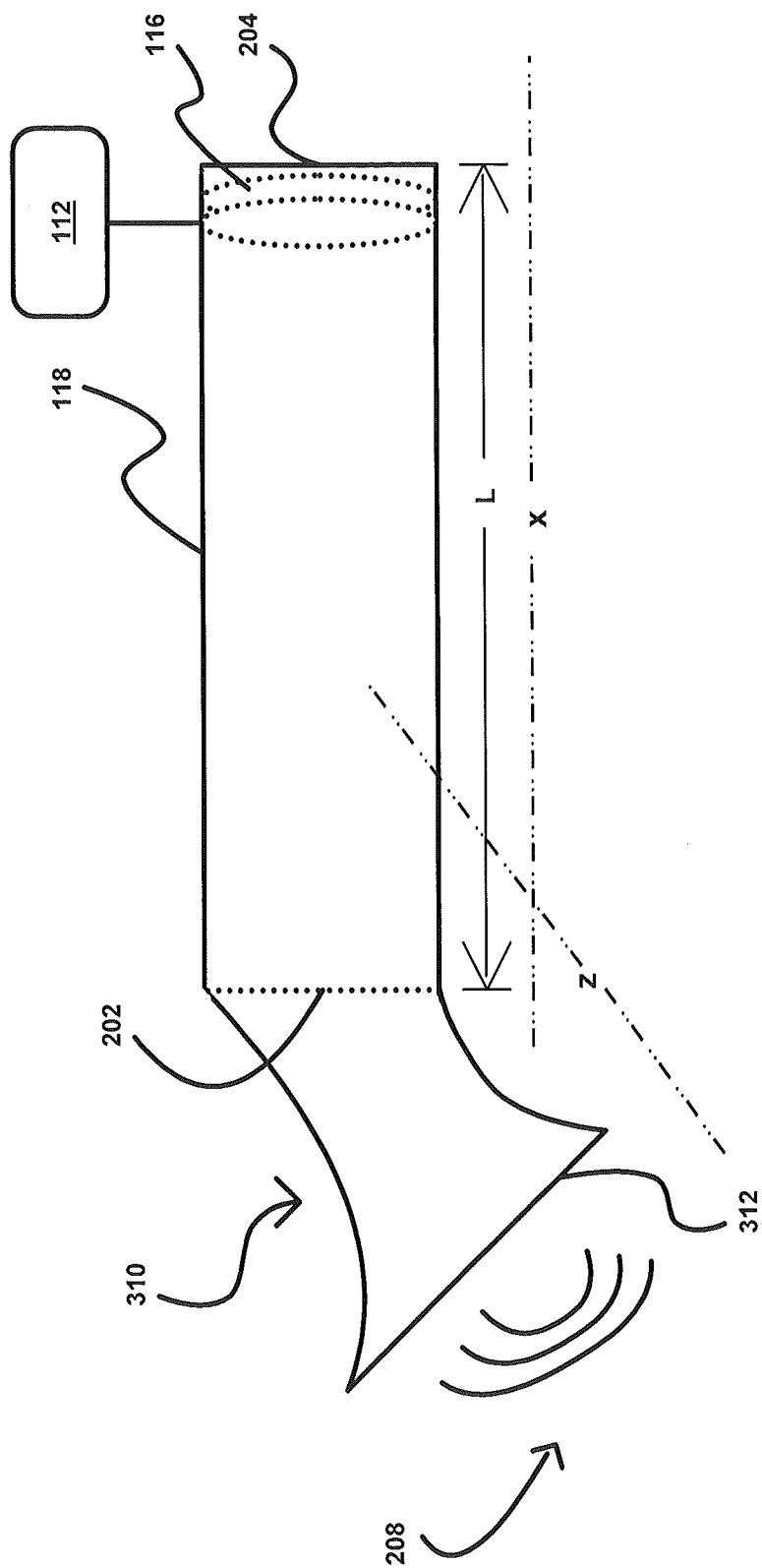
FIG. 3 is a diagram depicting a portion of an electric vehicle pedestrian warning system in accordance with an alternative embodiment.

In a further embodiment, as described above, an existing structural rail of the vehicle may be used in lieu of the custom-created container 118 shown in FIGS. 2-3. Once a defined length (L) is determined for achieving the targeted low frequency range desired, a baffle or similar structure may be disposed in the rail in order to partition the rail to create the desired length.

The pedestrian warning system 102 further enhances the second portion of the warning sound through directivity properties of an end treatment, as will be described in FIG. 3.

Turning now to FIG. 3, an alternative embodiment of the encapsulating container 118 will now be described. In the embodiment shown in FIG. 3, a top plan view of the container 118 is shown. The physical properties of the container 118 may be substantially the same as those described above with respect to the container 118 of FIG. 2, except that an additional end treatment 310 is provided. In an embodiment, the directivity of the high frequency portion 208 of the warning sound may be further enhanced by the end treatment 310, which is affixed to the open end 202 of the container 118. The end treatment 310 is positioned with respect to the container 118 such that its opening 312 is angled along a "z" axis to direct the high frequency portion of the warning sound outwardly from the container 118 and the vehicle itself. For example, if the length (L) of the container 118 is parallel to an "x" axis formed lengthwise along the vehicle, then the end treatment 310 would be positioned with its opening 312 facing an angle of approximately 30 degrees to 45 degrees with respect to the "x" axis. In this manner, the high frequency portion 208 of the warning sound is further directed away from the vehicle such that it can be perceived by pedestrians that within a certain distance from the vehicle.

The end treatment 310 has a curved shape, and flares out, widening, from its base at the open end 202 of the container 118 to the opening 312 of the end treatment 310. This configuration enhances the directivity of the high frequency portion 208 of the warning sound due to a megaphone effect. Thus, the high frequency portion 208 of the warning sound emitted through the container 118 is enhanced by acoustical properties of the shape of the end treatment 310, known as a megaphone effect.

While the end treatment 310 of FIG. 3 is shown and described as affixed to a custom created container (e.g., encapsulating container 118 of FIG. 3), the embodiments are not so limited. In particular, it is understood that the end treatment 310 may be easily modified to fit the vehicle structural rail described above. In an embodiment, the end treatment of the vehicle structural rail includes the same or similar properties as the end treatment described in FIG. 3.

While the embodiments described in FIGS. 2 and 3 are described has having a closed end 204 on the container 118, it will be understood that variations of this configuration may be implemented in order to realize the advantages described herein. For example, in an alternative embodiment, both ends of the container 118 may be open. In this alternative embodiment, the physical properties of the container may be modified in order to achieve the targeted frequency range desired. For example, if both ends of the container are open, a formula for determining acoustic resonant frequencies of sound in the container 118 may be represented as:

$$f_n = \frac{nc}{2L}$$

where $f_n$=resonant frequencies of the container; n=1, 2, 3, . . . ; and c=speed of sound in air (353 m/s). L is the length of container 118. In this embodiment, the speaker 116 may be affixed to either of the open ends of the container 118.

Technical effects of the invention provide enhanced pedestrian friendly warning sounds for a pedestrian friendly alert feature of an electric-drive vehicle. The enhanced pedestrian friendly warning sounds are derived in part using acoustical properties of an encapsulating container disposed in an underbody of the vehicle within which a speaker has been disposed. The acoustical properties of the encapsulating container amplify low frequency portions of the pedestrian warning sound and can be cancelled out by an existing active noise cancellation function of the vehicle with respect to the sound level perceived by vehicle occupants.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A pedestrian warning system for an electric vehicle, comprising:
    an encapsulating container disposed in a location of the electric vehicle that is exterior to an interior cabin of the electric vehicle;
    a speaker affixed to an interior portion of the encapsulating container;
    an amplifier coupled to the speaker;

1. a computer processor communicatively coupled to the amplifier and a vehicle network; and
logic executable by the computer processor, the logic configured to transmit a sound file to the speaker through the amplifier over the vehicle network upon activation of the electric vehicle, the sound file comprising a pedestrian warning sound;
wherein a first portion of the pedestrian warning sound is output by the speaker and amplified using acoustical properties of the encapsulating container, the first portion of the pedestrian warning sound amplified in a low frequency range capable of being cancelled by an active noise cancellation system that is located in the interior cabin and coupled to the vehicle network.

2. The system of claim 1, wherein a length of the encapsulating container is determined as a function of a target low frequency range of the pedestrian warning sound.

3. The system of claim 1, wherein a first end of the encapsulating container is open and a second end of the encapsulating container is closed.

4. The system of claim 3, wherein the speaker is disposed at the second end of the encapsulating container and facing toward the open end.

5. The system of claim 3, wherein acoustic resonant frequencies of sound for the encapsulating container are determined by:

$$f_n = \frac{nc}{4L}$$

where $f_n$, is the acoustic resonant frequencies of the encapsulating container; n=1, 3, 5, . . . ; c represents speed of sound in air (353 m/s); and L is a length of the encapsulating container.

6. The system of claim 1, the first portion of the pedestrian warning sound is broadcast at the speaker at a frequency below 400 Hz.

7. The system of claim 1, wherein the first portion of the pedestrian warning sound is amplified by the acoustical properties of the encapsulating container in the low frequency range.

8. The system of claim 1, wherein a second portion of the pedestrian warning sound is transmitted at a high frequency range above or equal to 400 Hz.

9. The system of claim 1, wherein the encapsulating container is configured to have a cylindrical shape.

10. The system of claim 1, wherein the speaker is configured to be approximately 65 mm in diameter, and 30 mm in thickness, with a power of 1 Watt.

11. The system of claim 1, further comprising an end treatment affixed to the open end of the encapsulating container, the end treatment angled approximately 30 degrees to 45 degrees with respect to an axis along the length of the encapsulating container, the axis extending lengthwise with respect to a length of the electric vehicle;
wherein an angle of the end treatment directs the second portion of the pedestrian warning sound away from the electric vehicle.

12. The system of claim 1, wherein a first end of the encapsulating container is open and a second end of the encapsulating container is open.

13. The system of claim 12, wherein the speaker is disposed at one of the first end and the second end.

14. The system of claim 12, wherein acoustic resonant frequencies of sound for the encapsulating container are determined by:

$$f_n = \frac{nc}{2L}$$

where $f_n$, is the acoustic resonant frequencies of the encapsulating container; n=1, 2, 3, . . . ; c represents speed of sound in air (353 m/s); and L is a length of the encapsulating container.

15. A pedestrian warning system for an electric vehicle, comprising:
a vehicle structural rail disposed in an underbody of the electric vehicle;
a speaker affixed to an interior portion of the vehicle structural rail;
an amplifier coupled to the speaker;
a computer processor communicatively coupled to the amplifier and a vehicle network; and
logic executable by the computer processor, the logic configured to transmit a sound file to the speaker through the amplifier over the vehicle network upon activation of the electric vehicle, the sound file comprising a pedestrian warning sound;
wherein a first portion of the pedestrian warning sound is output by the speaker and amplified using acoustical properties of the vehicle structural rail, the first portion of the pedestrian warning sound amplified in a low frequency range capable of being cancelled by an active noise cancellation system that is located in the interior cabin and coupled to the vehicle network.

16. The system of claim 15, wherein the vehicle structural rail is partitioned by a baffle at a location internal to the vehicle structural rail to define a length, the length determined as a function of a target low frequency range of the pedestrian warning sound.

17. The system of claim 15, wherein the first portion of the pedestrian warning sound is broadcast at the speaker at a frequency below 400 Hz.

18. The system of claim 15, wherein the first portion of the pedestrian warning sound is amplified by the acoustical properties of the vehicle structural rail in the low frequency range.

19. The system of claim 15, wherein a second portion of the pedestrian warning sound is transmitted at a high frequency range above or equal to 400 Hz.

20. The system of claim 15, further comprising an end treatment affixed to the open end of the vehicle structural rail, the end treatment angled approximately 30 degrees to 45 degrees with respect to an axis along the length of the vehicle structural rail as defined by baffle, the axis extending lengthwise with respect to a length of the electric vehicle;
wherein an angle of the end treatment directs the second portion of the pedestrian warning sound away from the electric vehicle.

* * * * *